J. A. JEFFERY.
LOADING DEVICE FOR HARVESTING MACHINES.
APPLICATION FILED JUNE 11, 1917.

1,243,069.

Patented Oct. 16, 1917.
2 SHEETS—SHEET 1.

INVENTOR.
Joseph A. Jeffery.
BY Geo. Stevens.
ATTORNEY.

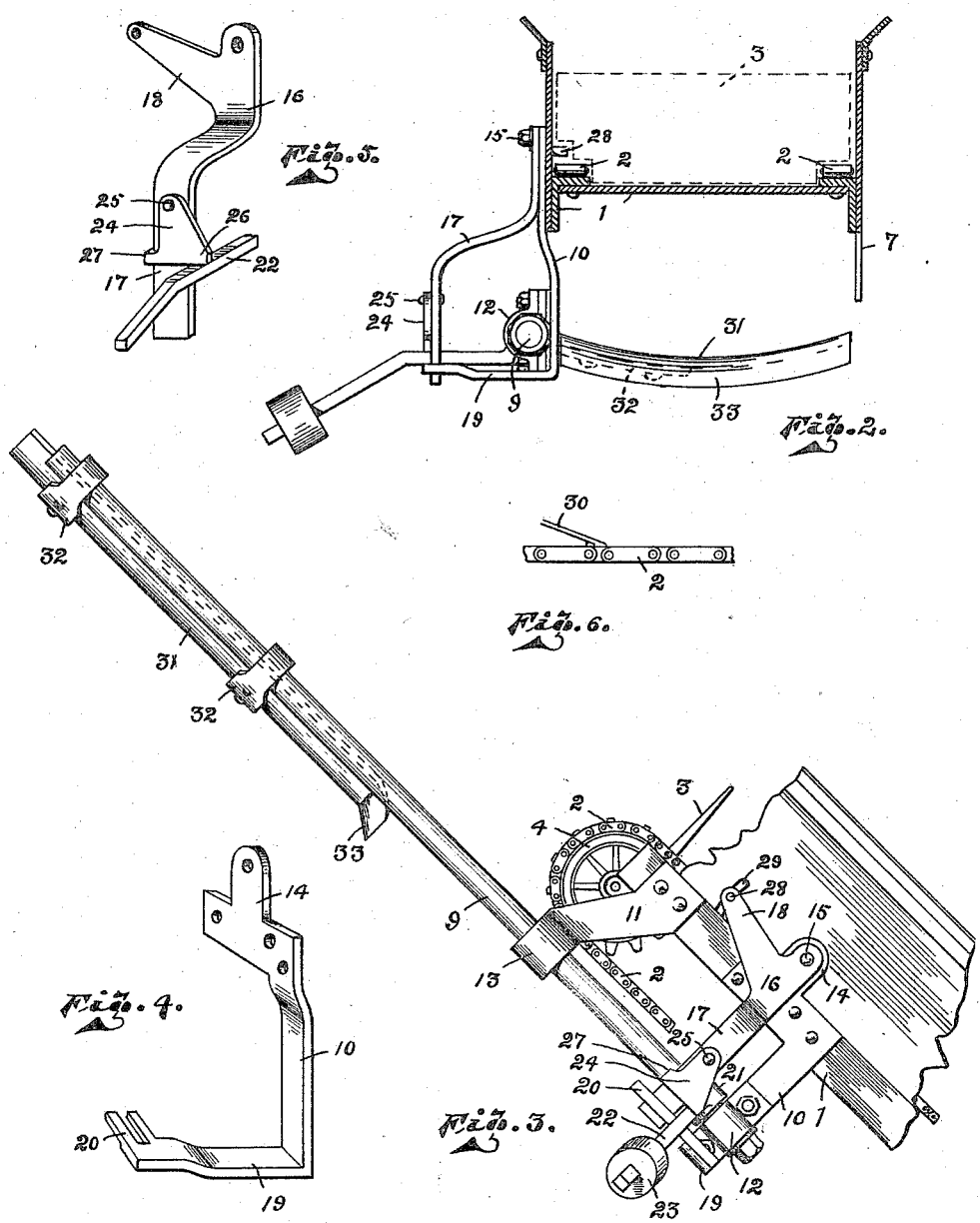

UNITED STATES PATENT OFFICE.

JOSEPH A. JEFFERY, OF DULUTH, MINNESOTA.

LOADING DEVICE FOR HARVESTING-MACHINES.

1,243,069.  Specification of Letters Patent.  Patented Oct. 16, 1917.

Application filed June 11, 1917. Serial No. 174,012.

*To all whom it may concern:*

Be it known that I, JOSEPH A. JEFFERY, a citizen of the United States, residing at Duluth, in the county of St. Louis and State of Minnesota, have invented certain new and useful Improvements in Loading Devices for Harvesting-Machines, of which the following is a specification, reference being had therein to the accompanying drawing.

This invention relates to discharging devices for corn stalk conveyers and has special reference to such conveyers used in connection with corn harvesters and wherein the corn stalks are carried either in bound bundles or loosely from the harvester while in operation, directly to an accompanying vehicle.

There are different forms of such conveyers in common use and which deliver the stalks in varying conditions to the vehicle being loaded and the principal object of this invention is to provide practical means whereby a uniform and positive delivery of the stalks is made to the vehicle being loaded.

The advantages of such a device are obvious and well known to those versed in the art of corn harvesting.

In the accompanying drawings forming part of this application and in which like reference characters indicate like parts:

Fig. 2 is a transverse sectional view of a conveyer equipped with the discharging device and looking toward the discharging end of the conveyer.

Fig. 3 is a side elevation of Fig. 1, illustrating the manner of attachment of the discharging device to the end of the conveyer.

Fig. 4 is a perspective view of the principal one of the attaching brackets.

Fig. 5 is a similar view of the apron tripping lever, and

Fig. 6 is a side elevation of a portion of the conveyer chain to which the tripping dogs are attached.

Figure 1:
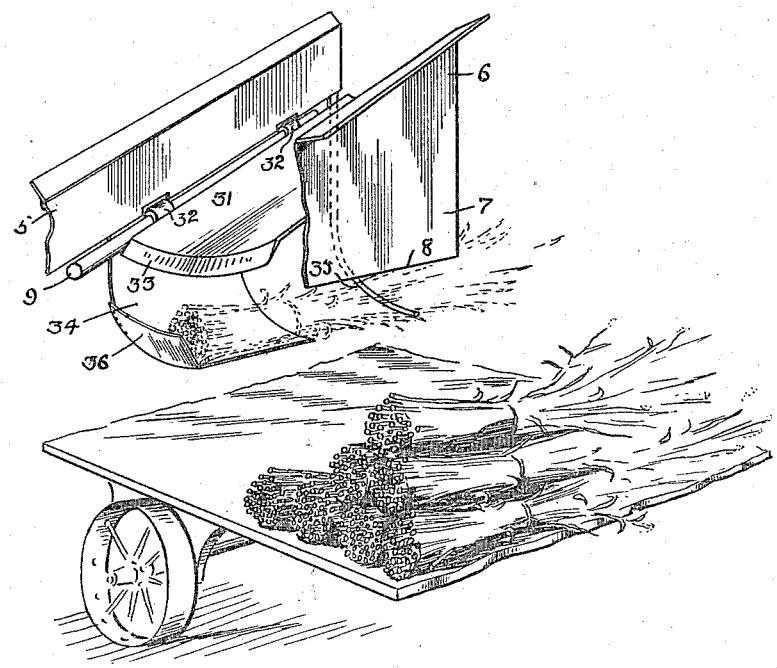
Figure 1 is a fragmental perspective view of a portion of the discharging device, illustrating its relation to a receiving vehicle.

1 represents the outer discharge end of an endless chain conveyer, which is usually made of fabricated metal structure, having longitudinally operative therein the double chain 2 with any desired form and number of conveyer slats or lifts 3 thereupon.

A pair of sprocket wheels 4 are journaled in the extreme end of the conveyer, over which the chains 2 travel, this being a form of loading conveyer common to corn harvesters of the class referred to and which are designed to deliver the corn stalks, after being cut, to an accompanying vehicle.

To the end of the conveyer I propose to add in any desired manner, though rigidly fixed thereto, an extension comprising the side wall 5, which is preferably a continuation of the side wall of the conveyer; the side wall 6, which is also a continuation of the opposite side of the conveyer but having a depending portion 7, the lowermost edge 8 of which is normally parallel with the deck of the vehicle being loaded. This depending portion acts as a shield and guide for the stalks as they are being adjusted preparatory to being discharged from the conveyer to the vehicle.

The extension also comprises a rockable shaft 9 journaled, as at 12 and 13, within suitable brackets 10 and 11 rigidly fixed to one side of the conveyer, said shaft being parallel with the side of the conveyer and spaced some little distance below same.

The bracket 10 has an extension 14 upon the upper portion thereof, in which is pivotally mounted, as at 15, the bell crank tripping lever 16 comprising the outwardly arched depending portion 17 and the arm 18 at substantially right angles thereto. The bracket 10 has formed at right angles thereto the lateral extension 19 having a slotted extension 20 formed integral therewith and parallel with the uppermost attaching portion of the bracket. Into this slotted portion 20 the free end of the portion 17 of the bell crank 16 extends and is there guided during its reciprocal travel.

Upon the shaft 9 and adjacent the bearing 12 is fixed a hub 21 carrying an outwardly extending rod 22 to which is attached a counterweight 23, the office of which will be described later. The rod 22 is designed to normally rest upon the upper face of the extension 20 intermediate of the free end of the portion 17 of the lever 16 and the extension 9 of the bracket 10.

As a locking means for said rod in the position described a pendulum catch 24 is pivotally carried, as at 25, upon the extension 17 of the lever 16 and has one corner 26, which normally overlaps the rod 22 and locks same rigidly in the position shown. The catch 24 is provided with a right angularly extending lip 27 which engages one edge of the extension 17 to prevent the catch from swinging beyond its locking position, as is obvious.

In the extreme outer end of the arm 18, and at right angles thereto, is fixed a pin 28 which extends through a suitable arcuate slot 29 in the side wall of the conveyer and just above the adjacent conveyer chain 2.

For ordinary conveyers two lifting slats 3 are sufficient and just a short distance in the rear of each slat is fixed to the chain 2, upon the side of the conveyer just being considered, a tripping dog 30 which consists of an upwardly inclined member for lifting engagement with the pin 28. When one of these dogs passes under the pin 28 the arm 18 of the lever 16 will be raised, which will withdraw the extension 17 of said lever from locking engagement with the rod 22 and allow same to be freely raised at such time.

Assuming, now, that a bundle of stalks has been elevated by the lifting slat 3 and forced longitudinally upon the dumping apron 31 the weight thereof will counteract that of the counter weight 23 and oscillate the shaft 9 to a point of dumping of the bundle, when the counter weight will, by gravity, resume its normal position and return the apron to its receptive position for another bundle, it being understood that the apron is rigidly fixed to the shaft 9, as by suitable supporting straps 32—32.

When the rod 22 is in the act of resuming its normal position it will engage the inclined surface of the pendulum catch 24 and operate same to cause it to automatically lock the lever while waiting for the performance of the next trick.

I prefer to incline downwardly the inner end of the apron 31, as at 33, just beneath which is located a downwardly and inwardly curved fixed apron 34, the lower discharging edge of which is parallel with the lower edge 8 of the side wall 6 and substantially in a vertical line therewith.

Spaced a distance beyond the end of this fixed apron 34 is a similarly bent rod 35 for engagement with the top end of the bundles of stalks for guiding same in their downward course. The fixed apron 34 is equipped with an inclined butting board 36 to prevent the stalks from sliding endwise toward the lower end of the conveyer and to insure a uniform longitudinal prostration of the bundles as they are discharged from the apron 34.

By this means the bundles, when dumped from the apron 31 on to the apron 34 and rod 35, are brought to a fully prostrated horizontal position and discharged upon the deck of the receiving vehicle in uniform and even succession, thus requiring the minimum of attention during the entire loading of the vehicle and effectually overcomes one of the most difficult problems in corn harvesting.

It is to be understood that various modifications of the structure herein shown may be resorted to without departing from the spirit of the invention.

Having thus described my invention what I claim as new and desire to receive by Letters Patent is,

1. The combination, with an inclined corn harvester conveyer trough, having an endless belt conveyer therein, of an extension of the trough beyond the discharge end of the conveyer belt having means whereby the stalks, when delivered from the belt, are held in a position parallel longitudinally with the trough until a predetermined point in the cycle of the belt is reached, when the stalks thus held are delivered in a horizontal position to an attending vehicle, and means for causing the stalks to assume such horizontal position prior to being delivered to the vehicle.

2. In combination, an inclined corn harvester conveyer trough, having an endless conveyer belt therein, an extension upon said trough beyond the discharging end of the belt, a tipping apron within the extension and parallel with the trough and a fixed apron below the tipping apron for alining the stalks horizontally while being discharged, substantially as described.

3. In combination, an inclined corn harvester conveyer trough, an endless conveyer belt operative within the trough, brackets fixed to the discharge end of the trough, a shaft journaled within the brackets, an apron fixed to the shaft a counterweight fixed to the shaft and opposed to the apron, shaft locking means pivotally carried upon the trough for holding the apron in receptive position, means carried by the endless belt for unlocking the locking means, and a second apron fixed to the trough and disposed below the first mentioned apron, said last mentioned apron having its discharge edge disposed in a horizontal plane, substantially as and for the purpose described.

4. A device of the character described comprising, in combination, a trough having an endless conveyer belt therein, an extension of the trough beyond the discharge end of the belt, a rockable shaft journaled upon the trough and adjacent the discharge end of the belt and substantially parallel therewith, an apron rigidly fixed to the shaft, means operated by the belt for holding or releasing the shaft, and a fixed inclined apron below the first mentioned apron having its discharge edge substantially horizontal, as and for the purpose described.

5. A device of the character described comprising, in combination, a trough having an endless conveyer belt therein, a receiving apron extending beyond the discharge end of the conveyer belt and parallel with the trough, means whereby the apron is automatically dumped, a fixed apron carried by the trough and designed to receive the stalks as they are dumped from the first mentioned apron whereby, when the stalks are discharged from the last mentioned apron, they are fully prostrated.

6. The combination, with a trough of the class described, having an endless belt conveyer therein, of means attached to the end of the trough for automatically prostrating the stalks as they are discharged from the trough, substantially as described.

In testimony whereof I hereunto affix my signature in the presence of two witnesses.

JOSEPH A. JEFFERY.

Witnesses:
W. H. DENHAM,
S. GEO. STEVENS.

Copies of this patent may be obtained for five cents each, by addressing the "Commissioner of Patents, Washington, D. C."